(No Model.) 2 Sheets—Sheet 1.

P. A. N. WINAND & C. O. C. BILLBERG.
MULTIPHASE ELECTRIC MOTOR.

No. 497,110. Patented May 9, 1893.

WITNESSES:
George Baumann
James Gracie

INVENTORS
Paul A. N. Winand
Karl O. C. Billberg

BY
Howson and Howson
ATTORNEYS.

(No Model.) 2 Sheets—Sheet 2.
P. A. N. WINAND & C. O. C. BILLBERG.
MULTIPHASE ELECTRIC MOTOR.

No. 497,110. Patented May 9, 1893.

UNITED STATES PATENT OFFICE.

PAUL A. N. WINAND AND CARL O. C. BILLBERG, OF PHILADELPHIA, PENNSYLVANIA.

MULTIPHASE ELECTRIC MOTOR.

SPECIFICATION forming part of Letters Patent No. 497,110, dated May 9, 1893.

Application filed March 22, 1892. Serial No. 425,984. (No model.)

*To all whom it may concern:*

Be it known that we, PAUL A. N. WINAND, a subject of the King of Belgium, and CARL O. C. BILLBERG, a subject of the King of Sweden and Norway, residents of Philadelphia, Pennsylvania, have invented an Improved Electrical Apparatus for Multiphase Currents, of which the following is a specification.

Our invention relates to that class of electrical appliances such as electro-dynamic machines and transformers, in which two or more alternating currents with different phases are employed for the production of a magnetic field rotating relatively to the conductors through which such currents pass, or on the other hand those in which magnetic fields are employed for the generation of currents.

The object of our invention is to so construct such an appliance that the strength of the field and the velocity of its rotation shall be as uniform as possible.

Figure 1:
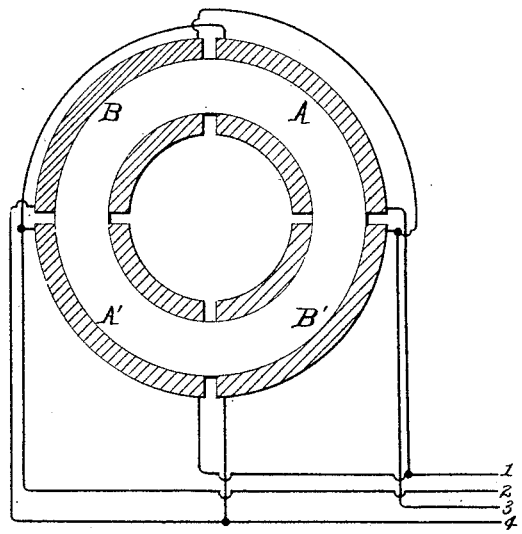
Figure 2:
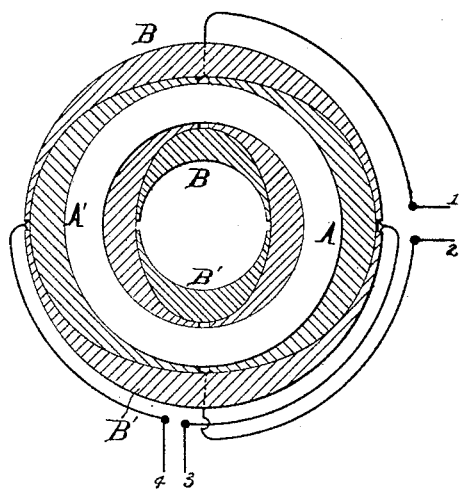
Figure 4:
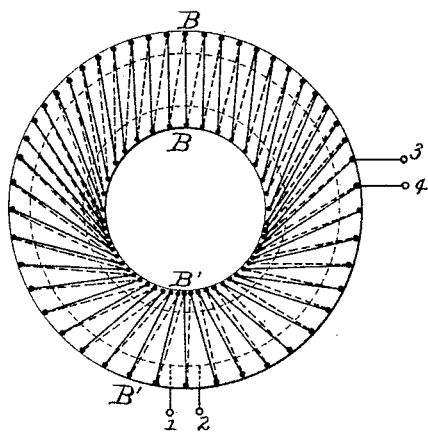
Figure 3:
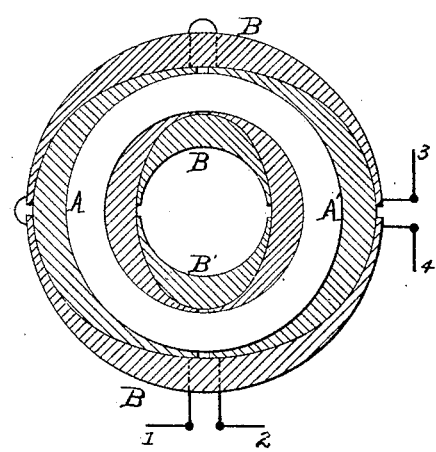
Figure 5:
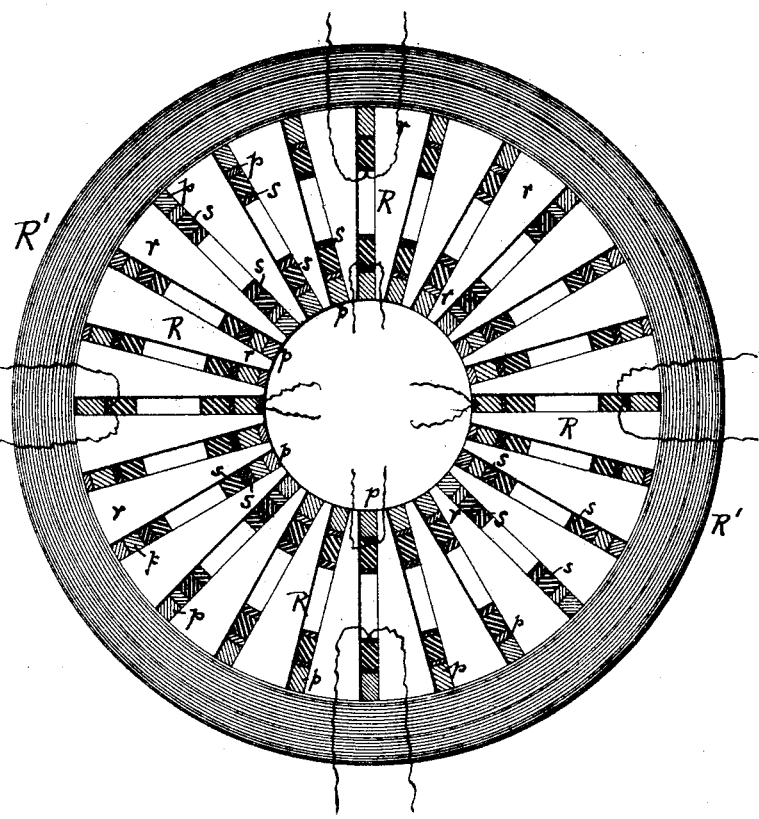

In the accompanying drawings, Figure 1 is a diagram illustrating a common form of electrical appliance for the employment of multiphase currents and consisting of an iron ring core wound with two sets of coils for two currents whose phases differ from each other by about ninety degrees. Fig. 2 is a diagram illustrating a similar electrical appliance when constructed according to our invention. Fig. 3 is a similar diagram also illustrating our invention, but showing the coils connected up a little differently from those shown in Fig. 2. Fig. 4 is a diagram of a modification of our invention. Fig. 5 is a diagram of the transformer constructed in accordance with our invention.

Referring to Fig. 1, A and A' are two coils connected to terminals 1 and 2, supplied with an alternating current, while the coils B and B', connected to the terminals 3 and 4, are supplied with another alternating current differing in phase from the first by about ninety degrees. In such a construction experience has demonstrated that neither the strength of the magnetic field nor its velocity is constant, and it is important that both should be constant in order to secure the best efficiency and proper working of such an electrical appliance. This constancy of strength of the magnetic field and of its velocity of rotation can be secured to a greater or less extent by increasing the number of multi-phase currents and corresponding coils and connections, but such a construction carries with it obvious objections. By the present invention a practical uniformity of strength of the magnetic field and velocity of rotation can be obtained with as few as but two currents of different phases, and even when such currents are not at ninety degrees difference of phase; if properly applied, in accordance with our invention, the total number of ampère turns will be at any given moment the same, and their distribution along the core will always be the same, that is, producing the desired uniform rotation of a constant magnetic field of unvarying form. The core should be laminated, as in other alternating current appliances.

Our invention consists in winding the coils, which are supplied with alternating currents of different phases, so that such coils overlap each other, and this in such a manner that each coil has a magnetic effect on the core greatest at the center of the coil and diminishing toward the opposite ends of the coil, where it overlaps or is overlapped by the other coils.

Referring to Fig. 2, it will be seen that the coils A A' are connected as before to the terminals 1 and 2, supplied with an alternating current, while the coils B and B' are connected to the terminals 3 and 4 supplied with an alternating current differing in phase by about ninety degrees from that supplied to the coils A and A'. Instead, however, of each coil being wrapped around only about a quarter of the ring core, each coil extends over nearly one half the ring so that the coils B and B' overlap the coils A and A'. Thus the coil B, for instance, overlaps about one half of the coil A and about one half of the coil A', while similarly the coil B' overlaps about one half of the coil A' and about one half the coil A. It will be seen, however, that where the coils overlap each other the number of turns or windings gradually diminishes from the center of each coil toward its outer ends and thus gives a diminishing magnetic effect. This diminishing magnetic effect can be produced in other ways than by diminishing the turns of each coil; for instance, illustrated in the diagram Fig. 4, it can be obtained by gradually changing the angle of the winding from the center of each coil toward their opposite ends, where the coils overlap. It will be understood that these coils may be connected up in various ways; in Figs. 2 and 4, they are shown as connected up in parallel, while in Fig. 3 they are shown as connected in series.

It can be mathematically demonstrated that an electrical appliance such as an electro-dynamic machine or transformer employing multi-phase alternating currents and constructed as above described, that is with the different coils overlapping each other with diminishing magnetic effect, will produce a magnetic field practically uniform in strength and uniform in the velocity of rotation.

In a case of a transformer the secondary as well as the primary coils can be wound according to this invention, and by distributing the coils along the ring any number of primary coils of different phases can be transformed into any number of currents whose phases are independent of those of the primaries. The transformer should preferably be made in the form of a laminated iron ring R provided with teeth or projections $r$ between which the wire should be wound in a succession of coils, as indicated in Fig. 5. Another laminated iron ring R′, in contact with the outer ends of the projecting teeth of the ring core serves to complete the magnetic circuits. In the diagram, Fig. 5 it will be seen that the primary coils $p$ as well as the secondary coils $s$ are wound to overlap each other with diminishing magnetic effect, as already described with reference to the more simple form of electric appliance for the employment of multi-phase circuits. For transformers, however, the present invention has less importance perhaps than for electric motors, because the pulsations in intensity and velocity of the field have in that case a much less harmful effect. When, however, currents of a non-symmetrical polyphase system (as for instance two currents of other than ninety degrees difference of phase) are to be employed or obtained in the transformer, this invention is especially applicable, since the field thus obtained is symmetrical and uniform in all cases.

We claim as our invention—

1. An electrical appliance for the employment or generation of multi-phase alternating currents, consisting of a core wound with coils, the coils for the different phase currents being wound to overlap each other with diminishing magnetic effect, substantially as and for the purpose described.

2. An electrical appliance for the employment or generation of multi-phase alternating currents, consisting of a core wound with coils, the coils for the different currents being wound to overlap each other with turns or windings gradually diminishing in number as described.

In testimony whereof we have signed our names to this specification in the presence of two subscribing witnesses.

PAUL A. N. WINAND.
CARL O. C. BILLBERG.

Witnesses:
HUBERT HOWSON,
HARRY SMITH.